J. R. SAMPLE.
SEED-PLANTER.

No. 187,321. Patented Feb. 13, 1877.

WITNESSES:
E. Wolff
J. H. Scarborough

INVENTOR:
J. R. Sample
BY
Munn
ATTORNEYS.

UNITED STATES PATENT OFFICE.

JACOB R. SAMPLE, OF LIBERTY, MISSISSIPPI, ASSIGNOR TO HIMSELF AND WILLIAM P. ANDERSON, OF SAME PLACE.

IMPROVEMENT IN SEED-PLANTERS.

Specification forming part of Letters Patent No. 187,321, dated February 13, 1877; application filed December 23, 1876.

*To all whom it may concern:*

Figure 1:
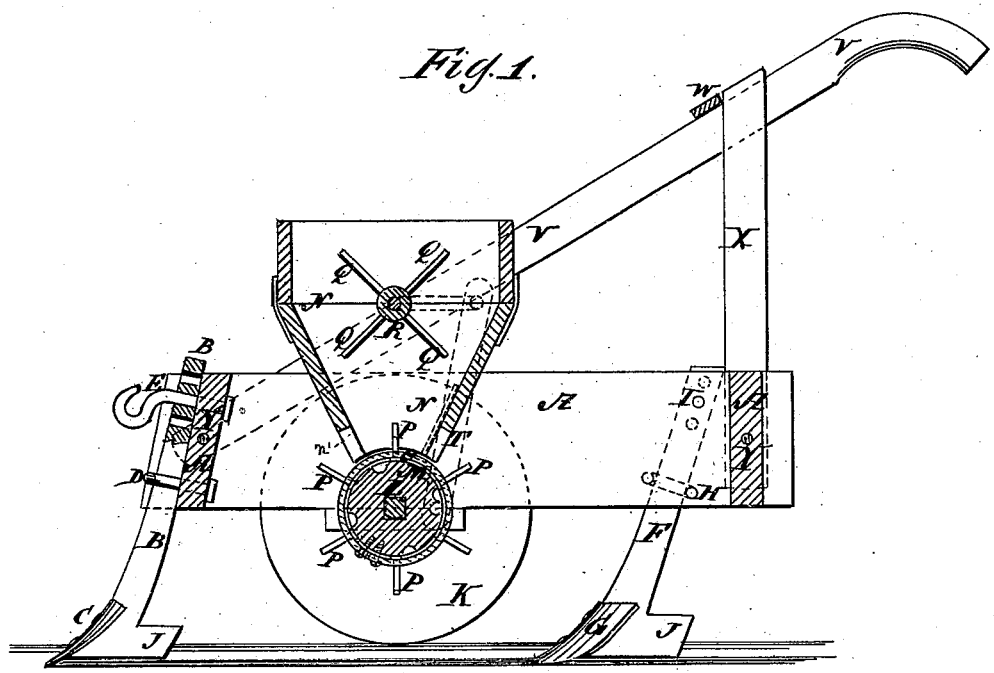
Figure 2:
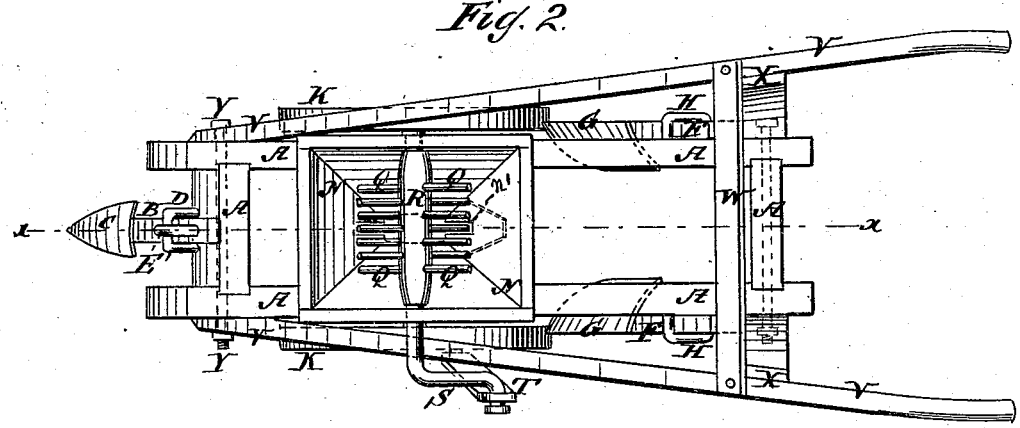
Figure 3:
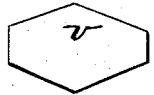

Be it known that I, JACOB R. SAMPLE, of Liberty, in the county of Amite and State of Mississippi, have invented a new and useful Improvement in Seed-Planter and Fertilizer-Distributer, of which the following is a specification:

Figure 1 is a vertical longitudinal section of my improved machine, taken through the line $x\ x$, Fig. 2. Fig. 2 is a top view of the same. Fig. 3 is a detail view of one of the slides.

Similar letters of reference indicate corresponding parts.

The object of this invention is to furnish an improved machine, which shall be so constructed that it may be readily adjusted to plant corn, peas, and other smooth seeds, and to plant cotton-seed and distribute fertilizers, and which will run steady, and may be easily guided when in use.

The invention consists in the leather strap provided with the radial spikes or pins, in combination with the grooved dropping-cylinder and the slotted lower end of the hopper, as hereinafter fully described.

A is the frame of the machine, which consists of two side pieces, connected at their ends by two cross-pieces. The front cross-piece of the frame A is set at an inclination, as shown in Fig. 1, to give a proper set to the standard B of the opening-plow C. The standard B passes through a keeper or U-bolt, D, attached to the lower part of the front cross-piece of the frame A, and is further secured in place by a bolt, E, which passes through the said standard and cross-piece, and upon the forward end of which is formed a hook to receive the draft. Several holes are formed in the standard B to receive the bolt E, so that the standard B may be adjusted to cause the plow C to work deeper or shallower in the ground, as may be required. To the rear parts of the side pieces of the frame A are attached the standards F of the covering-plows G. The standards F pass through U-bolts H, or other keepers attached to the lower part of the side pieces of the frame A, and their upper ends are secured by bolts or pins I, which pass through them and through the said pieces.

Several holes are formed through the upper parts of the standards F, to receive the bolts I, to enable the said standards to be raised and lowered to adjust the plows to work at any desired depth in the ground. To the rear sides of the lower ends of the standards B F are formed, or to them are attached, horizontal bars J, which slide along the ground in the bottom of the furrows opened by the plows C G, so as to give steadiness of motion to the machine, and make it more easily guided. K are two wheels, which are rigidly attached to the ends of the axle L, so as to carry the said axle with them in their revolutions. The axle L revolves in bearings attached to the side pieces of the frame A. To the center of the axle L is attached a wheel or cylinder, M, around the center of which is formed a ring-groove. In the wheel M, at the bottom of its ring-groove, are formed recesses or cups $m'$ to receive the seed and drop it to the ground. N is the hopper, which is attached to the side pieces of the frame A, and the lower edges of the sides of which are concaved to fit upon the cylinder M, so that the said cylinder may serve as a bottom to the said hopper. When the machine is to be used for planting cotton or for distributing fertilizers, a leather strap, O, is passed around the cylinder M in its groove, and its ends are secured to said cylinder detachably by screws. Through the strap O, at suitable distances apart, are attached pins or spikes P, the heads of which rest upon the bottom of the groove of the cylinder M, and which project radially. The spikes or pins P pass through slots $n'$ in the lower part of the front and rear sides of the hopper N, so as to take hold of the cotton-seeds or fertilizer, drawing the same from the hopper, and allow the seeds or fertilizer to drop to the ground. The cotton-seed or fertilizer is stirred up and fed downward, so that they may be drawn out by the pins or spikes P, by radial pins or spikes Q attached to the shaft R, that works in bearings in the adjacent edges of the sides of the upper and lower parts of the hopper N, so that it may be detached by detaching the upper part of the said hopper.

To one end of the shaft R is attached, or upon it is formed, a crank, S, to which is pivoted the upper end of the pitman T. The lower end of the pitman T is pivoted to a crank-pin attached to one of the wheels K, at such a distance from its center that the revolution of the said wheel K may only rock the shaft R.

When the machine is to be used for planting corn, peas, and other smooth seeds, the stirrer and the spiked strap are detached, and the slots in the lower parts of the front and rear sides of the hopper N are closed by the slides U, which are so formed as to fit against the lower part of the front and rear sides of the hopper N.

V are the handles, the upper parts of which are connected by a round or cross-bar, W, and are supported by the uprights X. The lower ends of the handles V and uprights X are secured by long bolts Y, that pass through the side pieces of the frame A, and longitudinally through the cross-pieces of said frame.

Having thus described my invention, I claim as new and desire to secure by Letters Patent—

The leather strap O, provided with the radial spikes or pins P, in combination with the grooved dropping-cylinder M and the slotted lower end of the hopper N, substantially as herein shown and described.

JACOB REED SAMPLE.

Witnesses:
A. J. ROBINSON,
C. P. McKNIGHT.